(12) United States Patent
Mizrachi (10) Patent No.: US 10,389,585 B2
(45) Date of Patent: Aug. 20, 2019

(54) SYSTEM AND METHOD FOR DATA FLOW OPTIMIZATION

(71) Applicants: Dror Mizrachi, Munich (DE); Huawei Technologies Co., Ltd., Shenzhen (CN)

(72) Inventor: Dror Mizrachi, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 101 days.

(21) Appl. No.: 15/529,932

(22) PCT Filed: Nov. 25, 2014

(86) PCT No.: PCT/EP2014/075452
§ 371 (c)(1),
(2) Date: May 25, 2017

(87) PCT Pub. No.: WO2016/082859
PCT Pub. Date: Jun. 2, 2016

(65) Prior Publication Data
US 2017/0366398 A1    Dec. 21, 2017

(51) Int. Cl.
*H04L 12/24* (2006.01)
*H04L 12/751* (2013.01)
*H04W 40/18* (2009.01)
*H04L 12/721* (2013.01)

(52) U.S. Cl.
CPC ........ *H04L 41/0816* (2013.01); *H04L 41/083* (2013.01); *H04L 41/0813* (2013.01); *H04L 41/0823* (2013.01); *H04L 41/0853* (2013.01); *H04L 41/147* (2013.01); *H04L 45/08* (2013.01); *H04L 45/124* (2013.01); *H04W 40/18* (2013.01)

(58) Field of Classification Search
None
See application file for complete search history.

(56) References Cited

U.S. PATENT DOCUMENTS

| | | |
|---|---|---|
| 2002/0131386 A1 | 9/2002 | Gwon |
| 2002/0143928 A1* | 10/2002 | Maltz ............... H04L 29/06 709/224 |
| 2009/0046583 A1 | 2/2009 | Towster et al. |
| 2014/0330964 A1 | 11/2014 | Previdi et al. |

FOREIGN PATENT DOCUMENTS

| | | |
|---|---|---|
| CN | 101395594 A | 3/2009 |
| CN | 102164048 A | 8/2011 |
| EP | 2725752 A1 | 4/2014 |

* cited by examiner

*Primary Examiner* — Jeffrey R Swearingen
(74) *Attorney, Agent, or Firm* — Leydig, Voit & Mayer, Ltd.

(57) ABSTRACT

The disclosure provides a networked computing system, comprising at least one network communication interface connected to at least one network, the at least one network communication interface being configured to receive data from and to send data to the at least one network, a control component, wherein the control component is adapted to configure routes, wherein the control component is configured to provide current input parameters on the routes, and wherein an application component is configured to output predicted configuration parameters for future route configurations based on predictions, based on the predicted configuration parameters output by the application component.

20 Claims, 6 Drawing Sheets

SYSTEM AND METHOD FOR DATA FLOW OPTIMIZATION

CROSS-REFERENCE TO RELATED APPLICATIONS

This application is a national stage of International Application No. PCT/EP2014/075452, filed on Nov. 25, 2014, which is hereby incorporated by reference in its entirety.

FIELD OF THE DISCLOSURE

The present disclosure relates to a system and a method for data flow optimization and especially to a system and a method for optimizing data flows in a networked computing system, i.e. optimizing how data received by the networked computing system data is forwarded before it is sent by the networked computing system. Particularly, the disclosure relates to optimizing the routes on which data is forwarded a software-defined network (SDN). The optimization is preferably performed by an SDN-application.

BACKGROUND

Modern communication and data networks comprise network nodes, such as routers, switches, bridges and other devices which transport data through a network. Over the years, the telecommunication industry has made improvements to the network infrastructure and especially to the nodes used in this network infrastructure to support an increasing number of network protocols but to also allow for defining rules, specifications and standards that have to be met by the network infrastructure (also called constraints or constraint parameters in the following).

Creating and coupling complex network nodes to form network infrastructure that support and implement various standards and protocols, e.g. which allow virtual private networks (VPN), require that the nodes can be easily configured.

To allow an easy configuration and management of a large number of network infrastructure nodes, software-defined networking provides an approach to achieve this goal.

In SDNs, in principle, the configuration of a network node is decoupled from the physical setup of the network nodes. This allows, on an abstract level, to define the requirement of how and where the network data is sent (this is often referred to as the "control plane"). An underlying, more physical plane exists, that actually forwards the data to the selected destination according to the requirements set on the control plane (this portion of the setup is typically called "data plane").

Therefore, in an SDN the data forwarding capability is decoupled from the routing, resource and other management functionality, which was previously performed in the network nodes. Network nodes, such as virtual switches (e.g. an open virtual switch, open vSwitch (OVS)), that support SDN (i.e. that are SDN-compliant) may be configured to implement the functions according on the data plane, while the control plane functions may be provided by an SDN controller managing and controlling the configuration on the data plane.

An application programming interface (API) may manage the interaction between the data plane and the control plane and allow for the implementation of (non-vendor specific) combinations of networking nodes and SDN controllers within a network. As a result, SDNs in conjunction with the provided API service may provide numerous benefits to network infrastructures which, e.g., include increased network virtualization, flexible control and utilization of the network but also customization of networks according to specific requirements and the optimization of the data flow through the network.

Typically, the control plane which comprises the SDN controller interacts with an "application plane" through the API. On the application plane, SDN applications are provided, which communicate their network requirements and desired network behavior to the control plane. In addition, they may consume an abstracted view of the network for their internal decision making process. An SDN application may also expose another layer of abstracted network control thus offering one or more higher level interfaces which can be used to communicate with the application.

In order to optimize the data forwarding through in the networked computing system, it is beneficial to also perform the network optimization in an SDN application as this allows keeping the relatively unchanged or completely unchanged control plane with a relatively unchanged SDN controller.

The disclosure hence aims at proving improved optimization functionality on the application plane level which allows optimizing the data forwarding through the system.

SUMMARY

Hence, in a first aspect the disclosure provides a networked computing system, comprising at least one network communication interface connected to at least one network, the at least one network communication interface being configured to receive data from and to send data to the at least one network, a control component, wherein the control component is adapted to configure routes on which the data received by the networked computing system from the at least one network is sent to the at least one network, wherein the control component is configured to provide current input parameters on the routes, the received data and/or the sent data to an application component, wherein the application component comprises a prediction module configured to evaluate the current input parameters and/or past input parameters of the received data, the sent data, and/or the routes, and wherein the application component is configured to output predicted configuration parameters for future route configurations based on predictions made by the prediction module on basis of the current input parameters and/or the past input parameters to the control component, and wherein the control component is adapted to dynamically configure and/or reconfigure the routes during operation of the networked computing system, based on the predicted configuration parameters output by the application component.

Therefore, the routes, on which the data flows or is forwarded through the system are optimized by the application component on the application plane while the control component on the control plane provides the required data as current input parameters needed for optimization to the application component. The control component facilitates configuration and/or reconfiguration of the routes on which the data flows through the network in order to optimize the data flow through this system according to performance constraints or in respect to constraints resulting from requirements or contracts of the network operator with other (legal) entities.

In particular, the application component comprises a prediction module. The prediction module takes parameters supplied by the control component and/or by a monitoring of an internal and/or external process and evaluates these parameters. The control component supplies parameters which indicate a current state of the network or portions thereof to the application component. The application component may evaluate the current input parameters and may use past parameters, which, e.g. are stored in the application component or a storage component functionally linked to the application component. The current and past input parameters can be information about the received data, sent data and/or the route which exists in the network or the networked computing system, respectively, currently or that existed in the network previously.

The prediction module then, based on the evaluation of the current input parameters and maybe past input parameters predicts configuration parameters. These predicted configuration parameters are used for a new or future route configuration. That means that based on the parameters available to the prediction module, the prediction module makes a prediction on how a better route configuration may serve for an improved data flow through the network.

The control component uses the predicted configuration parameters to reconfigure routes or to establish new routes or remove existing routes from the network according to these predicted parameters. This is made in an effort to anticipate, from the current state of the network a future state of the network that is better adapted to deal with the data flowing through the network or set constraints.

This is advantageous, as by using the application component with the prediction module, it is possible to anticipate future network configurations based on the current and/or past state of the network.

In a first possible implementation according to the first aspect, the application component can be configured to operate in two operating modes, a first operating mode, in which the application component monitors the current input parameters with a monitoring module comprised in the application component and/or evaluates constraint parameters for forwarding the data on the routes, and a second operating mode, in which the predicted configuration parameters are output to the control component.

This basically means that in the first operating mode, the application component monitors the parameters received from the control component which include information on the current state of the network.

A monitoring module hence accepts the information from the control component while, in the first operating mode, no prediction is made or output by the prediction module of the application component. In this mode, only information is gathered based on the input parameters received from the control component. Also, constraint parameters that put constraints on the data flow through the network can be evaluated. The constraint parameters e.g. can detail on which routes the data can or should be forwarded, how much resources are required or available for this operation and/or other parameters of the routes need to be changed.

The first operating mode can therefore also be regarded as the "boot process" of the networked computing system. Here, the initial configuration of the application module is obtained and performed and the required parameters are gathered, based on which the first predictions of the prediction module are made. At the end of the first operating mode, the prediction module/application component starts outputting predicted configuration parameters.

In a second possible implementation form according to the first aspect as such or according to the first implementation form of the first aspect, the prediction module may implement at least one prediction model, the prediction model being configured to make predictions according to a time series algorithm and/or an ensemble of time series algorithms.

The prediction model hence performs calculations in and for the prediction module. In particular, the prediction module, can comprise more than one or a plurality of prediction models, each of which outputs one possible predicted configuration parameter candidate for a future network configuration based on current or past input parameters.

Using more than one prediction model is advantageous, as it allows choosing from a plurality of predicted configuration parameter candidates and hence selecting the best prediction for the future state or the network. As a result, the system becomes adaptive to various environments and in particular to unknown datasets. In addition, it is scalable and a model can be added/removed before the system is used.

In a third possible implementation form according to the first aspect as such or according to any of the preceding implementation forms of the first aspect, the current input parameters may be performance metrics determined by the monitoring module, and wherein the current/past input parameters can be current/past performance metrics, and wherein the monitoring module may be configured to supply the current performance metrics to the prediction module as input to the at least one prediction model.

Hence, the monitoring component can also be used to derive from the input parameters performance metrics.

In a fourth possible implementation form according to the first aspect as such or according to any of the preceding implementation forms of the first aspect, the performance metrics can include information on at least one of a frame delay rate, a jitter rate, and a packet loss rate, transmitted packets, received packets, received bytes, transmitted drops, received drops, transmitted errors, flow count transmitted packets, received packets, transmitted bytes, and received errors.

Hence, a variety of information can be included in the performance metrics and taken into account by the optimization.

In a fifth possible implementation form according to the first aspect as such or according to any of the preceding implementation forms of the first aspect, the application component may be configured to output the predicted configuration parameters according to the constraint parameters. Hence, based on the constraint parameters provided, the future network configuration can be specifically tailored to the needs of the operator of the networked computing system and agreements and contracts by taking into account the constraints provided for the network.

The constraint parameters may be dynamic policies and/or constraints according to a quality of service (QoS) and/or a service license agreement (SLA).

In a sixth possible implementation form according to the first aspect as such or according to any of the preceding implementation forms of the first aspect, the at least one prediction model can generate at least one predicted configuration parameter candidate, wherein the prediction is made for a specific point of time based on the current and/or past input parameters.

The predicted configuration parameter candidate is thereby predicted by using e.g. time series algorithm for a defined number of time steps into the future.

According to a seventh possible implementation form according to the first aspect as such or according to any of the preceding implementation forms of the first aspect, the application component can comprise a weighting module, which is configured to weight the at least one predicted configuration parameter candidate with a weighting parameter defined based on the current and/or past input parameters, the weighting module being further configured to output at least one weighted prediction configuration parameter, and/or wherein the weighting is based on a real-time evaluation of the current and/or past input parameters. The evaluation may employ a root-means-square (RMS) error calculation or a means average error calculation.

The weighting hence allows to "weight" the predicted configuration parameter candidates output by the at least one prediction model according to an initial configuration or based on data present in the application component or supplied through the monitoring module. This can be facilitated by a reconfiguration of the model's weights as well as the model's parameters e.g. by changing the buffer size, the order of regression etc. The tuning of the model parameters may be achieved by a mini batch gradient descent technique and/or a brute force technique. For example, if it turns out that specific prediction models are suited for specific network configurations, when a specific network configuration is detected or assumed based on the input parameters, the weighting of the predicted configuration parameter candidates can be changed, i.e. a factor is applied to the output of the at least one prediction model that either reduces or elevates the significance of this predicted configuration parameter candidate.

In an eighth possible implementation form according to the first aspect as such or according to any of the preceding implementation forms of the first aspect, the application component can comprise a combination module, which is configured to combine the at least one weighted predicted configuration parameter candidate with at least one other weighted predicted configuration parameter candidate, the combination module being further configured to output the at least one combined predicted configuration parameter.

The combination module hence allows to combined the weighted output of the at least one prediction model to a single predicted configuration parameter that may then be output to the control component. Based on the weighting, the differently weighted predicted configuration parameter candidates either have more or less impact during the combination depending on the weighting applied to the predicted configuration parameter candidates output by the at least one prediction model.

In a ninth possible implementation form according to the first aspect as such or according to any of the preceding implementation forms of the first aspect, the application component may comprise an output module, which is configured to perform an error correction on the at least one combined predicted configuration parameter, the output module being further configured to output the at least one predicted configuration parameter to the control component.

The error correction is advantageous as it allows reducing the errors, i.e. the noise in the output predicted configuration parameters.

In a tenth possible implementation form according to the first aspect as such or according to any of the preceding implementation forms of the first aspect, the application component can comprise an update module, which is configured to compare the at least one predicted configuration parameter candidate for the specific point in time with the current input parameters when the specific point in time is reached. The update module is configured to optimize the at least one prediction model using an optimization algorithm and/or wherein the update module is configured to reconfigure parameters of the at least one prediction model.

In an eleventh possible implementation form according to the first aspect as such or according to any of the preceding implementation forms of the first aspect, the update module is configured to update the at least weights set by the weighting module.

This allows modifying the prediction models and the parameters used in the prediction models for the predictions made as well as to update the weights used to weight the predicted configuration parameter candidates dynamically. This can be based on a deviation of the input parameters that were used for previous predictions to the parameters monitored currently by the monitoring module. This allows to react on changes of the data forwarded through the networked computing system and to dynamically adapt the optimization to the current state of the network to be controlled.

In a twelfth possible implementation form according to the first aspect as such or according to any of the preceding implementation forms of the first aspect, the application component implements a neural network or machine learning.

Advantageously, the implementation of a neural network and/or machine learning method allows the networked computing system to autonomously adapt to the network requirements and the current network state and adapt its configuration to the current needs or the network, without manual interference. In fact, the machine learning uses the learning phase (first operating mode) to learn which requirements are necessary for forwarding the data through the network, but also how the network performs under certain conditions. The application component is then, after the learning phase is finished, capable of configuring the routes in the network autonomously solely based on the information supplied by the control component.

In the learning phase the prediction models are configured based on the information supplied by the control component or the monitoring module and are then used to make prediction or decisions, rather than following only explicitly programmed instructions. Machine learning generally has strong ties to artificial intelligence and optimization, which deliver methods, theory and application domains to the field. Machine learning is employed as designing and programming explicit, rule-based algorithms is infeasible or leads to increased costs. The machine learning can be in form of a supervised learning, in which the application component uses example input and desired outputs provided to the application component to learn general rules that map the inputs to the outputs. Also, an unsupervised learning can be facilitated in which the application component, in which e.g. groups of input parameters are provided to the application component and the prediction module, has to determine, how these inputs need to be processed in order to achieve a set goal.

Neural networks in the sense of the disclosure are artificial neural networks and represent computation models inspired by a central nervous system to estimate or approximate functions that depend on a large number of inputs. Artificial neural networks are generally presented as systems of interconnected neurons which compute values from the inputs and are capable of machine learning as well as pattern recognition thanks to an adaptive nature. Neurons in this case are processing elements or processing units and are typically arranged in at least two layers, the neurons of each layer being connected by synapses. Weights can be applied to the synapses. The neurons in the one layer perform calculations and the synapses "transport" the result of the calculations to the neurons of the other layer. If weights are applied to the synapses, the calculation results of the neurons in the first layer connected to the synapse are manipulated before input to the connected neurons of the second layer. However, also artificial neural networks with only one layer are possible.

In summary, the use of a machine learning approach or a neural network allows to create an autonomously working application component that adapts its predictions based on the input parameters.

In a second aspect the disclosure provides a method for controlling a networked computing system, wherein in a first step at least one network communication interface connected to at least one network receives data from and sends data to the at least one network, in a second step a control component configures routes on which the data received by the networked computing system from the at least one network is sent to the at least one network, wherein in a third step the control component provides current input parameters on the routes, the received and/or the sent data to an application component, wherein in a fourth step a prediction module of the application component comprises a prediction module, which evaluates the current input parameters and/or past input parameters of the received data, the sent data, and/or the routes, and wherein the application component outputs predicted configuration parameters based on predictions made by the prediction module on basis of the current input parameters and/or the past input parameters for future route configurations to the control component, and wherein in a fifth step the control component dynamically configures and/or reconfigures the routes during operation of the networked computing system, based on the predicted configuration parameters output by the application component.

In a third aspect, the disclosure relates to a computer program product, which, when executed on a computing system, is adapted to perform a method as outlined above.

In a fourth aspect, the disclosure provides a system, comprising a communication interface configured to receive data and to send data, a control component, wherein the control component is adapted to configure routes on which the data received by the computing system is sent, wherein the control component is configured to provide current input parameters on the routes, the received and/or the sent data to an application component, wherein the application component comprises a prediction module configured to evaluate the current input parameters and/or past input parameters of the received data, sent data, and/or the routes, and wherein the application component is configured to output predicted configuration parameters based on predictions made by the prediction module on basis of the current input parameters and/or the past input parameters for future route configurations to the control component, and wherein the control component is adapted to dynamically configure and/or reconfigure the routes during operation of the computing system based on the predicted configuration parameters output by the application component.

BRIEF DESCRIPTION OF THE DRAWINGS

The above described aspects and embodiments of the present disclosure will now be explained in the following also with reference to the figures.

DETAILED DESCRIPTION OF THE EMBODIMENTS

Generally, it has to be noted that all arrangements, devices, modules, components, models, elements, units and means and so forth described in the present application could be implemented by software or hardware elements or any kind of combination thereof. All steps which are performed by the various entities described in the present application as well as the functionality described to be performed the various entities are intended to mean that the respective entity is adapted to or configured to perform the respective steps and functionalities. Even if in the following description of the specific embodiments, a specific functionality or step to be performed by a general entity is not reflected in the description of a specific detailed element of the entity which performs the specific step or functionality, it should be clear for a skilled person that these methods and functionalities can be implemented in respective hardware or software elements, or any kind of combination thereof. Further, the method of the present disclosure and its various steps are embodied in the functionalities of the various described apparatus elements.

The disclosure generally allows predicting network performance metrics for SDN applications such as router or load balancer, so that they can make decisions according to the prediction instead of according to preset results.

In the past, a data scientist needed to examine the historical performance logs, which are data sets in which the performance of the respective device is recorded according to different models or requirements. Then, a final decision needed to be made which model should be used to achieve the best performance. However, the historical performance logs are not always accessible or available. Also, human interaction is required to find the best configuration and only rarely an update is made to the configuration. Therefore, an adaptation of the network to the current requirements of the data forwarded through the network only rarely occurs.

The disclosure solves this problem in one embodiment by developing a machine learning system, which not only uses one model for predicting the future configurations of the routes in the network but at least in one embodiment uses several prediction models to achieve a better scalability but also a better accuracy of the prediction made for the network configuration and especially the configuration of the routes through which the data is sent and received. By implementing the update module, it is possible to use feedback from the predictions and also a comparison of the predicted configuration parameter with the current requirements to update the network configuration dynamically and automatically without human involvement.

Especially when data is streamed through a network, the disclosure allows a real time prediction of the required network configuration and therefore the application component is capable of providing predicted configuration parameters to the control component in real time so that the control component can reconfigure the route in the network accordingly. Also, this allows adapting the network configuration to changes, as e.g. in complex network structures, single components may fail and hence routes on which the data is sent or received and forwarded through the network may be changed due to the failure of those components.

Further, a feedback loop is used in the application component, which allows to compare current network configurations to predicted network configurations or parameters thereof and allows to further improve future predictions as in particular the parameters of the prediction models as well as the weighting performed by the weighting unit is adapted dynamically. For example, the weighting performed by the weighting module depends on a root-means-square error per module while the change of the prediction model parameters may depend on a brute force or mini-batch gradient descent optimization.

The error correction performed by the output module also allows reducing the noise in the combined predicted configuration parameters.

Hence, the metrics provided by the monitoring system, which e.g. may be a frame delay rate, a jitter rate and a packet loss rate but also a mean opinion score (MOS) for Voice over IP (VOIP) sessions can be evaluated by the prediction module.

Figure 1:
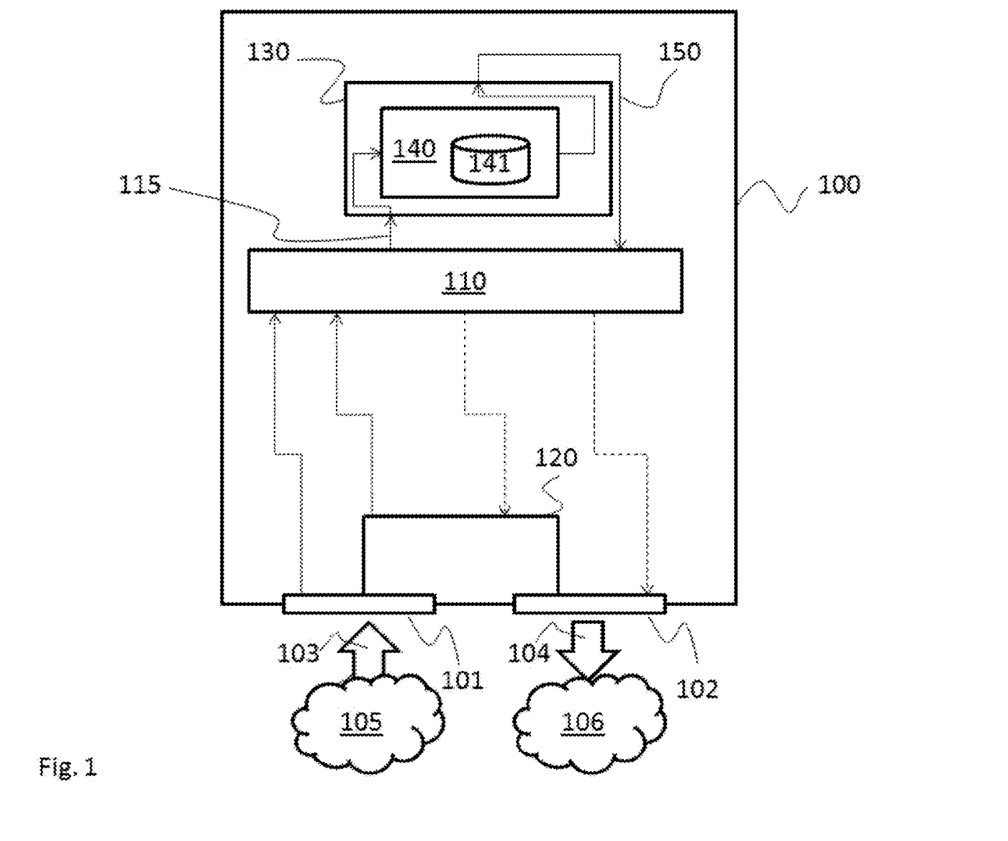
FIG. 1 shows a schematic overview of the disclosure.

FIG. 1 shows a general setup according to the first aspect of the disclosure. In FIG. 1, a networked computing system 100 is shown. The networked computing system comprises at least one network communication interface 101. In FIG. 1 two separate network communication interfaces 101 and 102 are shown. However, the networked computing system 100 can also include more communication interfaces 101, 102. If an interface is configured to send as well as receive data, the networked computing system may also comprise only one network communication interface 101. The networked computing system 100 uses the at least one network communication interface 101 to receive data 103 and to send data 104. The sending and receiving of data 103, 104 is illustrated by arrows. The networked computing system 100 may send data 104 to and receive data 103 from a single network 105 but also may send and receive data from more than one network 105, 106. The networks 105, 106 the networked computing system 100 is connected to can be of different type and different physical constraints may apply to them. For example, one network can be an IPv4 network while the other network can be an IPv6 network or one network can be a virtual network while the other network is a physical network. Of course, the networks 105, 106 can also be of the same type.

The networked computing system 100 further comprises a control component 110. The control component 110 is typically part of the control plane of the SDN network and may comprise an SDN controller such as OpenDaylight. The control component 110 is adapted to configure, change, reconfigure, setup, remove, and add or establish routes 120 on which data received by the networked computing system 100 from the at least one network 105 is sent to the at least one network 106. This means, the networked computing system 100 receives data from a network 105, 106 and forwards the data to either the same network or another network 106 on routes 120 which are configured by the control component 110. In FIG. 1 exemplarily the routes are shown by a thick line connecting the communication interfaces 101 and 102. Of course, in a special case, there might be only one route 120. These network elements used for forwarding (not shown) can be bridges, routers, switches and might either be conventional physical network equipment or virtual equipment such as virtual switches (e.g. OVS).

The control component 110 is configured to provide current input parameters 115 on the routes 120, the received data 103 and/or the sent data 104 to an application component 130. This means the information that represents the routes and their configuration as well as information about the data sent, received and forwarded can be provided to the application component 130, which is then capable of evaluating the current input parameters 115. The control component 110 hence is able to provide these input parameters to the application component 130. Additionally, the control component 110 may also provide the information about the configuration of the network elements and in particular, the input parameters include information about the configuration of the network components used for the routes in the networked computing system. In one embodiment, the control component 110 provides performance metrics to the application component 130.

The application component 130 further comprises a prediction module 140, which is configured to evaluate the current input parameter 115. Additionally, the application component may also evaluate past input parameters 141 and/or the previous prediction per model, which means that these parameters were previously provided by the control component 110 to the application component 130 and were stored in the application component 130 or the prediction module 140. The application component 130 can therefore comprise a storage unit which facilitates storage of these past input parameters 141. In particular, the past input parameters can contain information about the received data 103, the sent data 104 and/or the routes 120.

The application component 130 is further configured to output predicted configuration parameters 150 for future route configurations based on predictions made by the prediction module 140 on basis of the current parameters 115 and/or the past input parameters 141 to the control component 110.

The control component 110 is then adapted to dynamically configure and/or reconfigure the routes 120, which means that the control component 110 may establish new routes 120 or remove existing routes 120 or simply change the parameters of the routes 120, during operation of the networked computing system 100, based on the predicted configuration parameters 150 that are output by the application component 130.

In FIG. 1 the dotted lines represent information gathered by and/or supplied to the control component 110. This information may be derived from the routes 120, but also from the at least one network communication interface 101, 102. Similarly, the dashed lines represent configurations/reconfigurations of the routes 120 and/or the at least one network communication interface 101, 102 performed by the control component 110. The information about the routes 120 and/or the at least one network communication interface 101, 102 can already be in form of the current input parameters 115. Also the configuration/reconfiguration of the routes 120 and/or the at least one network communication interface 101, 102 can be directly performed using the predicted configuration parameters 150. Especially, the control component 110 may simply forward the information about the routes 120 and/or the at least one network communication interface 101, 102 as the current input parameters 115 or parts thereof to the application component 130. Also, the control component 110 may simply forward the predicted configuration parameters 150 as configuration parameters to the routes 120 and/or the at least one network communication interface 101, 102. Of course, instead of the routes 120 and/or the at least one network communication interface 101, 102, other network entities may supply information to and/or can be configured by the control component 110.

Figure 2:
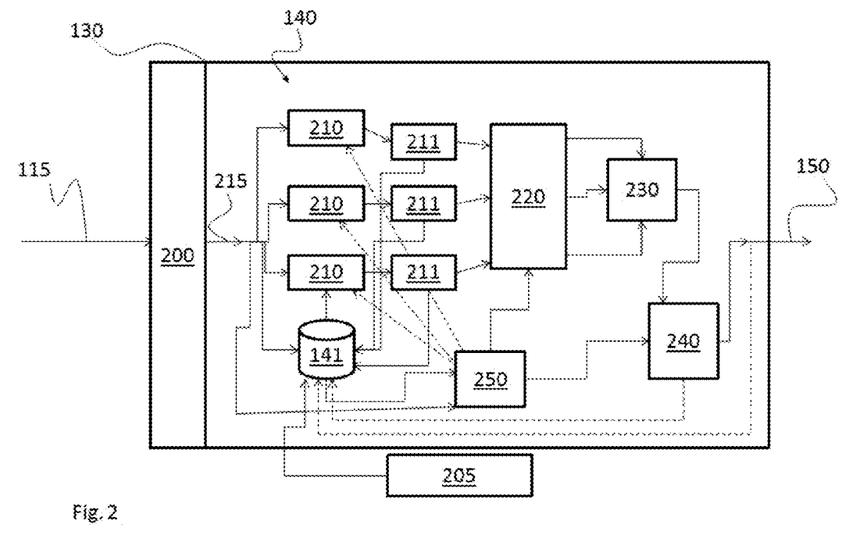
FIG. 2 illustrates in more detail embodiments of the disclosure.

FIG. 2 shows a more detailed view of the application component 130. As previously stated, the application component 130 may operate in two operating modes. In a first operating mode the application component 130 monitors the current input parameters 115 with a monitoring module 200. Preferably, the monitoring module 200 is comprised in the application component 130 and preferably evaluates a first frame of a network packet. However, it may also be possible that the monitoring module 200 is provided as a module separate from the application component 130.

The application component 130 is also capable of evaluating constraint parameters 205, which are supplied to the application component 130. The constraint parameters 205 define rules which define how data is forwarded on the routes 120. The first operating mode can also be regarded as a boot process, in which the application component gathers information on the current setup of the networked computing system 100 and which is used to initialize the parameters used by the application component 130. For example, the application component 130 may collect and store the input parameters input to the application component 130 by the control component 110, which are then used as past input parameters 141 for predictions made by the prediction module 140.

In the second operating mode the application component 130 then outputs the predicted configuration parameters 150 to the control component 110.

The prediction module 140 also comprises or implements at least one prediction model 210. The at least one prediction module 210 is configured to make predictions according to a time series algorithm. While FIG. 2 shows a plurality of prediction models 210, it has to be understood that these prediction modules can also be different setup, type and/or configuration. For example, a prediction module may make prediction according to a moving average calculation, an exponential smoothing calculation, an auto regression calculation and/or an autoregressive integrated moving average calculation and/or any other model (time-series algorithm, patterns etc.). Hence, the prediction modules 210 shown in FIG. 2 may each perform different predictions according to a different time series algorithm or they may combine different time series algorithms.

The monitoring module 200 can be further configured to determine performance metrics 215 and/or OVS metrics from the input parameters 115 supplied from the control component 110. The monitoring component is further configured to provide these performance metrics 215 and/or OVS metrics to the prediction module. The metrics are then used by the at least one prediction model 210 as input. Based on this input, i.e. based on the performance metrics 215 and/or OVS metrics, the at least one prediction model 210 is then able to provide a prediction. In the following, the performance metrics 215 can also be OVS metrics.

The performance metrics may include information on at least one of a frame delay rate, a jitter rate, a packet loss rate, MOS. The OVS metrics may include information on at least one of the transmitted packets, received packets, received bytes, transmitted drops, received drops, transmitted errors, flow count transmitted packets, transmitted bytes and/or received errors.

The prediction models 210 used by the application component 130 are however not provided statically, but they may be removed or added dynamically as required before the boot process of the network computing system 100. Typically, there is at least one prediction model 210. However, in case that all prediction models 210 are removed, the last prediction made by the last prediction model 210 is used. A prediction module 140 without a prediction model 210 works in a so-called reactive mode, which can be beneficial for specific data sets and constraint parameters 205. For example, when the dataset is stable most of the time e.g. in case the packet loss rate is about ~0% most of the time, the reactive mode will work better. In other case, like stock exchange, the reactive model will not work because there are lot of changes every tick (i.e. a defined time step). The main idea is to insert the reactive model into the list of prediction models 210, so in case of a "stable" dataset the reactive model will be used by the system automatically and in case of "noisy" dataset other model will be used.

However, typically, the prediction module 140 comprises more than one prediction models 210. The constraint parameters 205 may either be dynamic policies and/or constraints according, e.g., to a quality of service or a service license agreement. The application component 130 hence outputs the predicted configuration parameters 150 according to the constraint parameters 205 so that the configuration performed by the control component 110 in answer to the predicted configuration parameters 150 supplied by the application component 130 are in accordance to the constraint parameters 205.

The at least one prediction model 210 generates at least one predicted configuration parameter candidate 211, which is symbolized by the arrows linking the prediction model 210 to the predicted configuration parameter candidate 211. The prediction is made for a specific point in time and on basis of the current performance metrics 215 and/or the past input parameters 141. The predicted configuration parameter candidates 211 are preferably also stored as part of the past input parameters 141 (as indicated by the respective arrow linking predicted configuration parameter candidate 211 with the past input parameters 141).

The application component 130 also comprises a weighting module 220. The weighting module 220 weights the at least one predicted configuration parameter candidate 211 output by the at least one prediction model 210 with weighting parameter. The weighting parameter is also defined based on the performance metrics 215 (arrow with solid line) and/or the past input parameters 141 (arrow with dotted line). The past input parameters 141 can also be past performance metrics that were previously supplied to the application component.

The weighting module 220 is also configured to output at least one weighted predicted configuration parameter candidate to a combination module 230. The weighting performed by the weighting module 220 is in particular performed based on a real time evaluation of the performance metrics 215 and/or the past input parameters 141.

The combination module 230 combines the at least one weighted predicted configuration parameter candidate with at least one other weighted predicted configuration parameter candidate (if available). If there is only one weighted predicted configuration parameter candidate, the combination module simply forwards the weighted predicted configuration parameter candidate as a combined predicted configuration parameter. Otherwise, the combination module 230 outputs the combination of two or more weighted predicted configuration parameter candidates as the combined predicted configuration parameter.

Further, the application component comprises an output module 240. The output module is configured to perform an error correction on the at least one combined predicted configuration parameter. The output module 240 is further configured to output the at least one predicted configuration parameter 150 after the error correction to the control component 110.

The update module 250 can also be configured to compare the at least one predicted configuration parameter candidate 211 for a specific point in time, i.e. that means a parameter that was predicted previously to the performance metrics 215 supplied by the monitoring module 200 when the specific point in time for which the prediction was originally made is reached. The update module 250 may hence employ past input parameters 141. Based on this comparison and especially based on a deviation of the predicted configuration parameter to the current performance metrics, the update module optimizes the parameters of the at least one prediction model 210. The update module 250 therefore can employ an optimization algorithm. The update module 250 can further reconfigure parameters of the at least one prediction model 210, but also the weighting module 220. That means that after the update performed by the update module 250 the prediction model evaluates the performance metrics fed to the at least one prediction model 210. The algorithm used to optimize a model parameter can be a mini batch gradient descent algorithm and/or brute force algorithm. The mini-batch gradient descent algorithm is trying to minimize the error rate by finding the local minimum (gradient). Then it reconfigures the models, so they are supposed to be more accurate. The brute force algorithm is trying to check all the possibilities, while the mini-batch stops when the error is less than some tiny value (e.g. 0.005). Based on an output from the update module 250, also parameters of the output module 240 can be changed, e.g. to adapt the error correction.

For example, in a moving average prediction there is a buffer. It may be assumed that the buffer size set to be 20. In case the data is stable the optimization will be decreasing of this buffer size and in case of noisy data it will be increasing. The same holds for moving median prediction. In case of exponential smoothing prediction the alpha is changed to be more accurate to the history than the current value or vice versa. With an autoregressive integrated moving average (ARIMA) prediction e.g., the p,d,q parameters can be configured. In autoregression e.g. the order can be changed from 5 to 3 or 7 depending on the errors.

Figure 3:
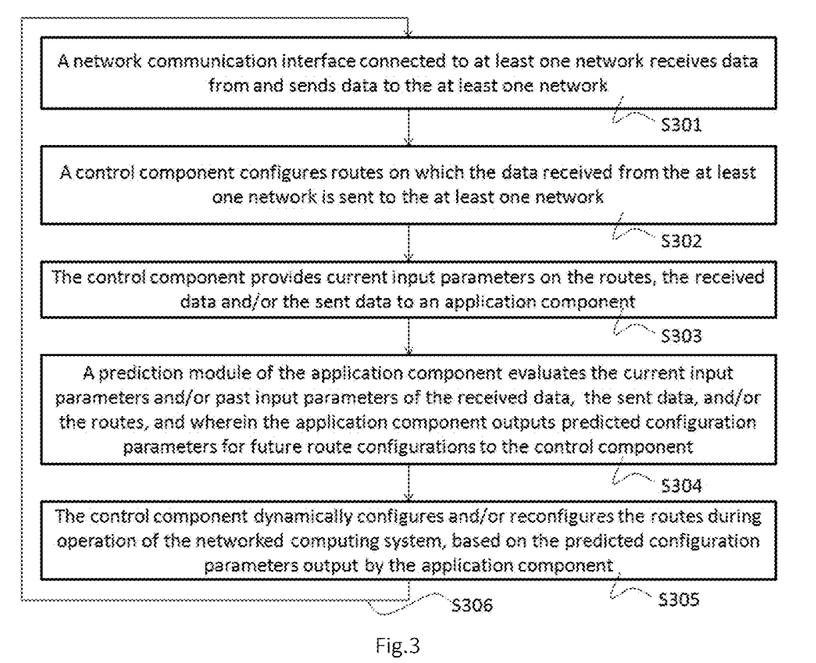
FIG. 3 illustrates a method according to the disclosure.

FIG. 3 shows the principle method according to the second aspect of the disclosure.

In a first step S301, a network communication interface 101, 102 connected to at least one network 105, 106 receives data 103 from and sends data 104 to the at least one network 105, 106.

In a second step S302, a control component 110 configures routes 120 on which the data received from the at least one network 105 is sent to the at least one network 106.

In a third step S303, the control component 110 provides current input parameters 115 on the routes 120, the received data and/or the sent data to an application component 130.

In a fourth step S304, a prediction module 140 of the application component 130 comprises a prediction module, which evaluates the current input parameters 115 and/or the past input parameters 141 of the received data 103, the sent data 104, and/or the routes 120, and wherein the application component 130 outputs predicted configuration parameters 150 for future route configurations to the control component 110.

In a fifth step S305, the control component 110 dynamically configures and/or reconfigures the routes 120 based on the predicted configuration parameters output by the application component 130.

A sixth step S306 indicates that the method steps S301-S305 are repeated until during operation of the networked computing system 100.

More concretely, the disclosure relates to an SDN environment, in which software-based components such as application components or SDN applications receive performance metrics from the monitoring component or monitoring system 200. The application components e.g. aim at improved routing in the networked computing system 100 or a load balancing of the network components controlled by the control component 110. For example, the application component 130 aims at making a better decision according to the constraint parameters (e.g. roles and responsibilities, while considering the incoming metrics 215 (e.g. performance and/or OVS metrics). For example, the application component can change the class selection proactively, which e.g. allows to use cheaper links in the network such as DSL (digital subscriber line) instead of expensive multi-protocol label switching (MPLS) while insuring a quality of service (QoS) and a service license agreement (SLA).

Instead of prior art approaches, the decisions made by the application component 130 are not solely dependent but may be dependent on decisions based on basic heuristics, e.g. predefined rules or simple static models, and can are sensitive to changes in the dynamic environment, such as a complex network infrastructure or a so-called "cloud" environment.

The disclosure hence uses time series analysis as a machine learning technique which enables the prediction of future values according to predefined logic. Prediction models used by the disclosure are moving average, exponential smoothing, autoregressive calculations, autoregressive integrated moving average and so on. Hence, a data scientist does not longer need to examine performance logs or data sets using different models to finally choose a suiting model but a plurality of models is typically used, and the results of the prediction models 210 are integrated to receive the best result for the current situation.

Hence, the problem of using a single model that is predefined and only updated rarely can be circumvented to adapt the networked computing system to unknown data and in a dynamic environment since the disclosure allows updating and tuning the configurations autonomously and automatically. Hence, the disclosure provides a hybrid approach, which combines several prediction models 210 instead of a single static model. This improves accuracy of the produced predicted parameters. In particular, the hybrid model predicts network performance in real time while minimizing the prediction errors on-the-fly. The disclosure not only predicts short-term metrics for the next time step, but also long-term metrics, that means metrics further into the future than the next time step (time step may also be called "tick" which defines a specific period of time) and to adjust automatically. However, the disclosure particularly is concerned with short-term prediction.

In particular, the disclosure deals with monitoring streams of data with the monitoring module 200. The monitoring module produces metrics, e.g. performance metrics such as a frame delay rate, a jitter rate, a packet loss rate, mean opinion score (MOS) for Voice over IP (VoIP) communication etc.

The disclosure allows receiving and evaluating performance metric values at time t while predicting the value for this metric for time t+k while $1 \leq k \leq \infty$. In the first operating mode, as outlined above, the application components start with aggregating performance metrics for a predefined time. This can also be regarded as the training phase for a machine learning approach. In this phase, it can also be determined, what kind of prediction models should be used, how the initial parameters of the prediction modules should be set, how the weights should be applied and what weights should be applied. For example, the weighting can be performed by using route-means-square error or mean absolute error calculations.

Also, during this first operating mode, the parameters of the prediction modules can be updated (or "tuned") using algorithms like the mini-batch gradient descent algorithm or a brute force algorithm. Also, it could be decided what error correction is performed by the output module 240. For example, it can be decided that no error correction is performed, that a specific error correction is performed or that the error is corrected according to the mean error of a number of past results.

According to the disclosure, the decision about the setup of the application component 130 according to the disclosure is performed automatically during the first operating phase based on the evaluation of the monitored metrics. In this process, other error correction can be performed such as root-means-square error correction, mean absolute error correction and others may be used.

Figure 4:
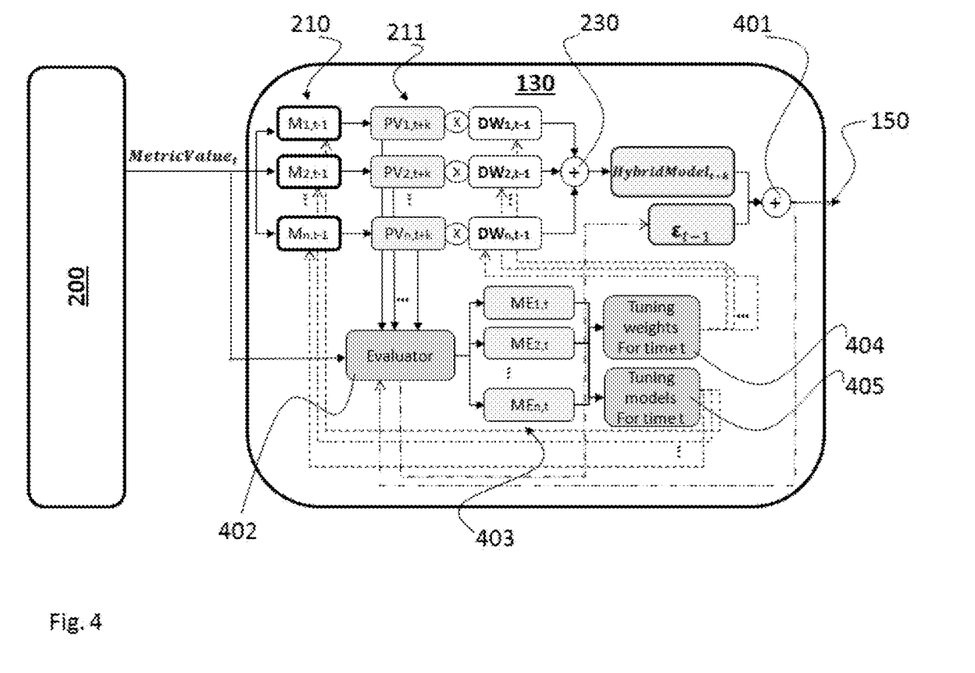
FIG. 4 shows an exemplary implementation according to the disclosure.

FIG. 4 shows in more detail the disclosure illustrated in FIG. 2.

Here, the monitoring module 200 outputs metric values to the application component 130 and in particular to prediction models 210 labelled with $M_{i,t-1}$, where i is the number of the prediction model, which is relevant for time t−1, while $1 \leq i \leq n$. The prediction models produce 210 predicted configuration parameter candidates 211, labeled with $PV_{i,t+k}$, where i is the number of the prediction model producing the predicted configuration parameter candidate for time t+k, while $1 \leq k \leq \infty$. The predicted configuration parameter candidates 211 are then weighted with the weights $DW_{i,t-1}$, which represent the dynamic weight of the prediction model i at time t−1.

The weighted predicted configuration parameter candidates are then combined in the combination module 230 to a "HybridModel$_{t+k}$" and an error correction value $\varepsilon_{t-1}$ is further combined at point 401 used to perform an error correction, where the error correction value is $\varepsilon_{t-1}$ for time t−1, to produce the predicted configuration parameters 150, or at least one online hybrid predicted value.

FIG. 4 also shows an evaluator 402, which can be a part of the update module 250, which can evaluate the metric values "Metric Value$_t$" provided by the monitoring module 200 for time t, and which can also evaluate the predicted configuration parameter candidates 211 ($PV_{i,t-k}$) to produce mean error values $ME_{i,t}$. The mean error values $ME_{i,t}$ represent mean errors of the latest n results of the predicted configuration parameter candidates at time t with the performance metrics MetricVlaue$_t$ provided by the monitoring module 200. The error correction can be the result of a root-means-square error (RMSE) or a mean absolute error (MAE) calculation for model i at time t. The tuning entities 404, 405 illustrate the update function or tuning function of the update module 250, while entity 404 updates the weights applied to the predicted configuration parameter candidates 211 and entity 405 updates the parameters of the prediction models 210.

Hence, the disclosure allows a real time prediction when a performance metric value MetricValue$_t$ at time t is provided. The models $M_{i,t-1}$ predict a metric value $PV_{i,t+k}$ for a time t+k. The HybridModel$_{t+k}$ is defined as $$\text{HybridModel}_{t+k} = \sum_{i=1}^{n} (PV_{i,t+k} \times DW_{i,t-1})$$

The error noise of the hybrid model can be defined as $$\text{OnlineHybridPrediction}_{t+k} = \text{HybridModel}_{t+k} + \varepsilon_{t-1}$$

The OnlineHybridPrediction$_{t+k}$ represents the output that is supplied to the control component 110 and hence the predicted configuration parameters 150 output by the output module 240. At time t the mean error $ME_{i,t}$ is calculated by comparing the latest predictions by one of the two formulas $$1 \leq i < n \quad RMSE_{i,t} = \sqrt{\frac{1}{m} \times \sum_{j=t-m+1}^{t} (MetricValue_j - PV_{i,j})^2}$$

and/or $$1 \leq i < n \quad MAE_{i,t} = \frac{1}{m} \times \sum_{j=t-m+1}^{t} |MetricValue_j - PV_{i,j}|$$

These mean errors will enable updating the prediction models 210 and their parameters but also the weights applied by the weighting module 220 dynamically. The dashed lines in FIG. 4 represent feedback lines. ActualValue$_j$ represents the actual metric value, which is compared to the predicted value, i.e. predicted configuration parameter candidate for prediction model i. The update of the weights is also performed based on the mean errors and the prediction models 210 can be sorted according to their mean error, where the lowest mean error can be defined to be the best. Therefore, the weight can be defined and updated as follows:

$$\forall \, 1 \leq i < n \quad TempDynamicWeight_{i,t} =$$

$$\begin{cases} 1, & \text{if } j = 1 \text{ and model } i \text{ has the mininal mean error} \\ 1 - \dfrac{|ME_{i,t}|}{\sum_{i=1}^{j} |ME_{i,t}|}, & \text{if } j > 1 \text{ and } i \leq j \\ 0, & \text{otherwise} \end{cases}$$

The weights can also be normalized, e.g. by performing the following calculation $$DW_{i,t} = \frac{TempDynamicWeight_{i,t}}{\sum_{i=1}^{n} TempDynamicWeight_{i,t}}$$

In this, $$\sum_{i=1}^{n} DW_{i,t} = 1$$

To update the prediction models 210, e.g., buffer sizes used by the prediction models or the order of the calculations performed by the prediction models, a mini-batch gradient descent algorithm can be used or brute force techniques can be applied to minimize the errors while changing the parameters of the at least one prediction model.

For example, for a given set of m values, in the case of exponential smoothing $$PV_j = (1-\alpha)*History + (\alpha)*lastValue$$

the parameter $\alpha$, $0 \leq \alpha \leq 1$ can be changed e.g. by 0.05 and the parameter $\alpha$ can be updated so that a minimal root-means-square error is produced.

The error correction can be performed to fix noise errors in the output of the application component 130 e.g. by calculating the root-means-square error or the mean absolute error (MAE) by the following calculation:

$$\varepsilon_t = ME_{Hybrid,t} = RMSE_{Hybrid,t} \text{ OR } MAE_{Hybrid,t}$$

In summary, in the disclosure an online hybrid model can be used in an ensemble of several known time series algorithms to predict network performance metrics near real time for short-term (next tick of time step) and long-term (next k ticks). This prediction can be used by SDN applications (e.g. router, load balancer etc.) that perform proactive optimization on changeable networks. The disclosure provides a fully automated boot process, but also online feedback can be used for tuning the models and the weights in an automatic evaluation process. An automatic error correction of the hybrid model prediction can also be provided.

Some of the benefits of the disclosure reside in the capability of handling online streaming data, near real time prediction, of predicting not only a short-term values but also a long-term values of metrics, of working on changeable environment with unknown behavior such as network, and of using an hybrid approach (ensemble of several prediction models for more scalability and better accuracy) instead of single model.

Figure 5:
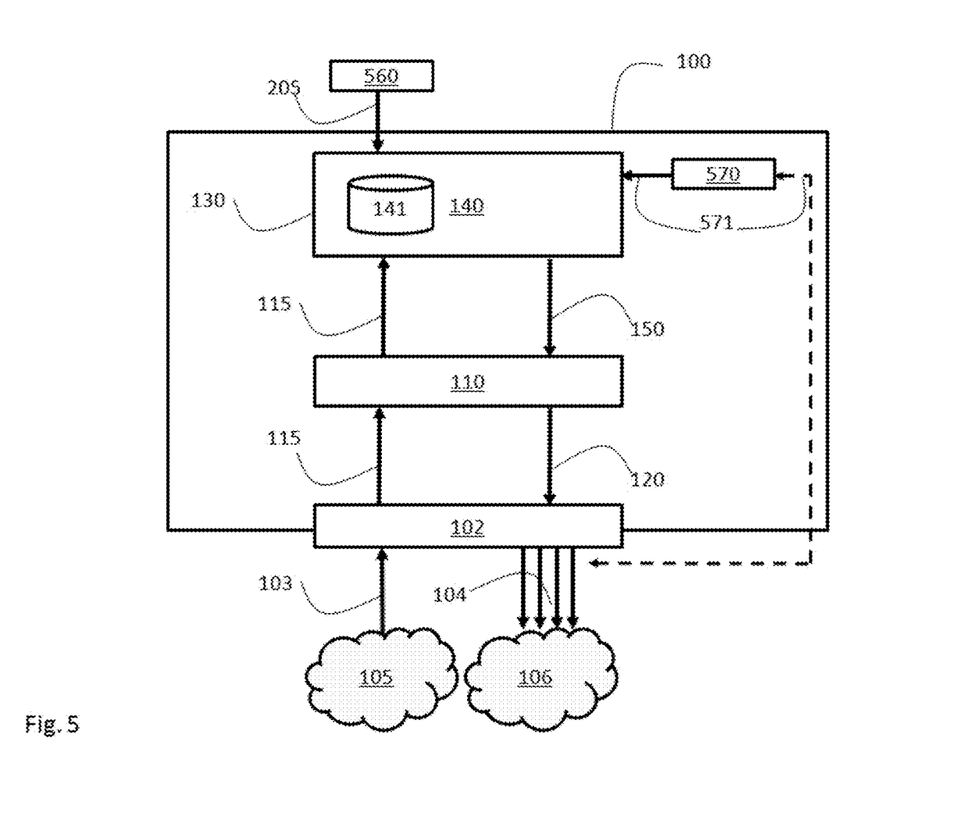
FIG. 5 shows an exemplary embodiment of FIG. 1.

FIG. 5 shows an exemplary embodiment of the embodiment shown in FIG. 1, and in particular a specific implementation thereof. Like elements are referred to by like reference signs. In FIG. 5, the network computing system 100, which can be a Wide Area Network (WAN) virtualization (see below), is shown with a single network communication interface 102, e.g. a vSwitch, i.e. a virtual switch. A virtual switch or open virtual switch (OVS) typically is a distributed virtual multilayer switch. The main purpose of the vSwitch is to provide a switching stack for hardware virtualization environments, while supporting multiple protocols and standards used in computer networks. The control component 110 is also shown and in particular represents an SDN controller e.g. OpenDaylight. Application component 130 in this case is in particular an SDN application with a (hybrid) prediction module 140. The past input parameters 141 stored preferably are prediction values and metrics according to a historical sliding window. A dashboard component, which in particular is user accessible, allows configuring the constraint parameters 205. The monitoring module 200 can be part of an external monitoring system 570 to measure performance metrics 571. The network computing system 100 can determine various information on the received data 103 from, e.g., a first frame of a network packet of the received data 103, e.g. type of content, type of service (TOS), priority, etc. The current input parameters 115 in this example are data from the OVS such as OVS metrics and first frame information. The reconfiguration of the routes 120 and the predicted configuration parameters 150 in this case are requests for OVS metrics and setting of new rules of the OVS, e.g. about which path of is to use for sending data 104. The WAN virtualization attempts to balance the load based on the flow by allocating low-cost WAN links, while ensuring a quality of service (QoS) using dynamic constraints.

For example, for VoIP calls the constraint parameters may be: maximum frame delay 150 ms, maximum jitter is 30 ms and the maximum packet loss rate is 1%. Upon violation of these constraints the flow is rerouted to another link, i.e. the routes 120 are reconfigured. For instance, the predication of each prediction model 211 at time i is looked at and set 1 when the criteria exceeded e.g. frame delay >=150 ms. Then the actual value at time i+1 is looked at and it is checked if the rerouting decision was right or not. Assume the buffer of moving average of the frame delay is 50, 30, 80, 100, 30, 70, 10, 120, 50, and 130. In this case the moving average prediction value is 67 ms. In this case the system will not reroute (as 67 ms is less than 150 ms) an existent flow. After few ticks the metric value exceeded 150 ms, then the system will reroute but it's too late. In case it is a video streaming a freeze for short time can happen. On the other hand, the online hybrid model can predict that the value will be 200 ms. Therefore the flow has to be routed immediately, so there will be no interrupt in the video.

Figure 6:
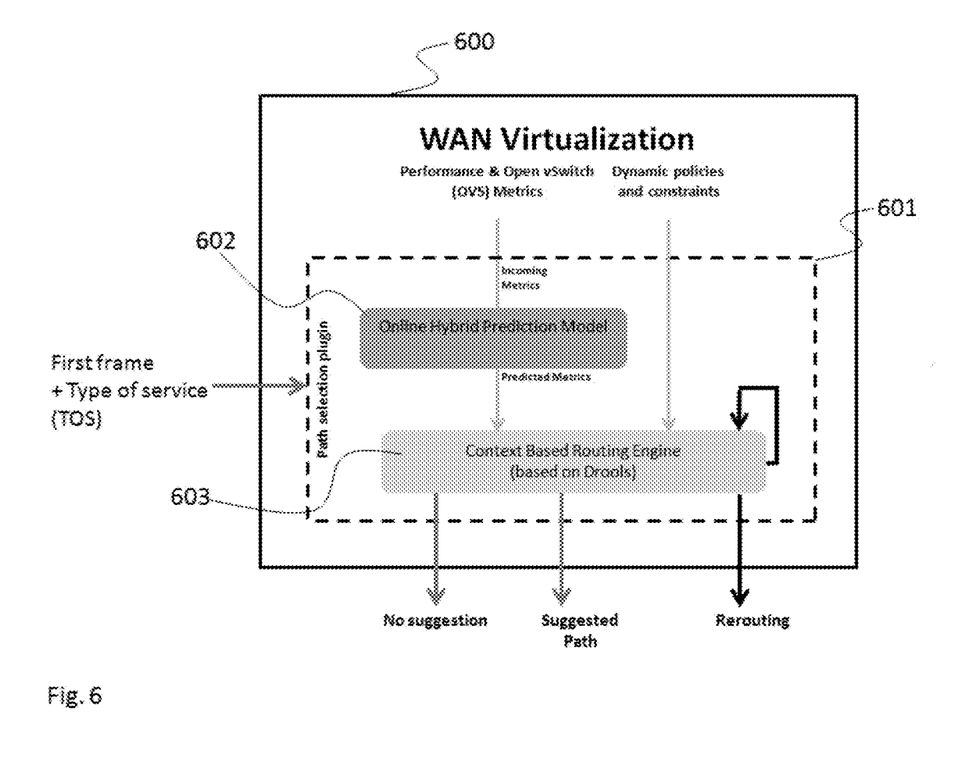
FIG. 6 shows an exemplary implementation schema of the inventive system.

FIG. 6 shows an exemplary implementation scheme of the inventive system. A WAN Virtualization 600 is shown which receives or generates performance and Open vSwitch (OVS) metrics as well as dynamic policies and constraints. A path selection plug-in 601, which resides on the application level, receives the performance and OVS metrics as input, as well as a first packet frame, which includes service information on e.g. a type of service (TOS). The path selection plug-in 601 may be or may be not part of the application component 130. The service information may also be supplied separately. The path selection plug-in 601 comprises the online hybrid prediction model 602, which also receives the performance and OVS metrics as input outputs predicted metrics and supplies them to a Context Based Routing (CBR) engine 603, which also accepts the dynamic policies and constraints. The CBR engine 603 can be based on "Drools", wherein "Drools" is a business rule management system (BRMS) with a forward and backward chaining inference based rules engine, also known as a production rule system, using an enhanced implementation of the Rete algorithm (a pattern matching algorithm for implementing production rule systems). "Drools" supports the JSR-94 (Java Specification Request for a Java Rules Engine API) standard for its business rule engine and enterprise framework for the construction, maintenance, and enforcement of business policies in an organization, application, or service. The CBR engine 603 may then output configuration parameters for the routes 120. It may output "no suggestion", which means that the application component 130, based on the supplied information, does not see the need for a reconfiguration of the routes 120. However, a reconfiguration might be advisable based on outputs from other application components. The CBR engine 603 may also output a "suggested path", on which the data should be forwarded. Moreover, the CBR engine 603 may output commands that facilitate a rerouting of the data and/or a reconfiguration of the routes 120, especially based on the constraints as well as the prediction of the performance metrics. This information can also be fed back to the CBR engine 603 and used as past configuration parameters 141.

In a more general embodiment, the disclosure can also be used in areas not related to networking. For example, in medicine a patient can be monitored and metrics can be provided such as body temperature, hypertension, blood oxygenation level etc. If some knowledge of threshold values of these metrics are available which cause diseases like cardiac arrest, the inventive solution (or the Hybrid-Model) will predict the future value of a given metric using an ensemble of prediction model models and tuning techniques. Thus a disease or its occurrence may be predicted by prediction of the metrics.

For trade related implementations a similar system can be envisioned e.g. in stock exchange. The disclosure will predict the future value of a given stock using the ensemble of prediction models and tuning techniques. Thus options can be provided on what to do with a stock.

In a cloud environment it can be decided when to scale up/out some virtual machines according to a prediction of some application metrics such as CPU, memory usage, I/O etc.

Hence, the disclosure in one embodiment provides a computing system, comprising a communication interface configured to receive data and to send data, a control component, wherein the control component is adapted to configure routes on which the data received is sent, wherein the control component is configured to provide current input parameters on the routes, the received and/or the sent data to an application component, wherein the application component comprises a prediction module configured to evaluate the current input parameters and/or past input parameters of the received data, sent data, and/or the routes, and wherein the application component is configured to output predicted configuration parameters based on predictions made by the prediction module on basis of the current input parameters and/or the past input parameters for future route configurations to the control component, and wherein the control component is adapted to dynamically configure and/or reconfigure the routes during operation of the computing system, based on the predicted configuration parameters output by the application component.

The disclosure has been described in conjunction with various embodiments herein. However, other variations to the enclosed embodiments can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

What is claimed is:

1. A networked computing system comprising:
a processor;
at least one network communication interface connected to at least one network, wherein the at least one network communication interface is configured to cooperate with the processor to send and receive data to and from the at least one network;
a storage medium for storing instructions for execution by the processor that, when executed by the processor, configure the processor to provide:
a control component configured to provide parameters describing at least one current route and/or data carried on the at least one current route; and
an application component configured to monitor the parameters provided by the control component and predict one or more future route configurations for data to and/or from the at least one network, wherein the application component comprises:
a prediction module configured to evaluate the monitored parameters and to output at least one predicted configuration parameter for the one or more future route configurations based on at least one of the monitored parameters and parameters of one or more past routes provided by the control component,
a weight module configured for weighting the at least one predicted configuration parameter with a weighting parameter based on the monitored parameters and to output at least one weighted predicted configuration parameter, wherein the weighting is based on a real time evaluation of the monitored parameters, and
a combination module configured to combine the at least one weighted predicted configuration parameter and at least one other weighted predicted configuration parameter and output at least one combined predicted configuration parameter; and
the control component is further configured to dynamically configure and/or reconfigure the routes during operation of the networked computing system based on the at least one combined predicted configuration parameter output by the application component.

2. The networked computing system of claim 1, wherein the application component is configured to operate in at least two operating modes as follows:
a first operating mode in which the application component monitors the parameters describing at least one current route and/or data carried on the at least one current route and/or evaluates constraint parameters for forwarding the data on the routes, and
a second operating mode in which the at least one combined predicted configuration parameter are output to the control component.

3. The networked computing system according to claim 1, wherein the prediction module implements at least one prediction model configured to make predictions according to a time series algorithm.

4. The networked computing system according to claim 1, wherein the parameters describing at least one current route and/or data carried on the at least one current route are performance metrics determined by the monitoring module, wherein the monitoring module is configured to supply the performance metrics to the prediction module as input to the at least one prediction model.

5. The networked computing system according to claim 4, wherein the performance metrics include information on at least one of a frame delay rate, a jitter rate and a packet loss rate, transmitted packets, received packets, received bytes, transmitted drops, received drops, transmitted errors, flow count transmitted packets, transmitted bytes, and received errors.

6. The networked computing system according to claim 1, wherein the application component is configured to output the at least one combined predicted configuration parameter according to the constraint parameters comprising dynamic policies and/or constraints according to a quality of service and/or a service license agreement.

7. The networked computing system according to claim 1, wherein the at least one prediction model predicts at least one predicted configuration parameter candidate, wherein the prediction is made for a specific point of time based on the monitored parameters.

8. The networked computing system according to claim 7, wherein the application component comprises an update module configured to compare the at least one predicted configuration parameter candidate for the specific point in time with the current input parameters when the specific point in time is reached, and/or wherein the update module is configured to optimize the at least one prediction model using an optimization algorithm, and/or wherein the update module is configured to reconfigure parameters of the at least one prediction model.

9. The networked computing system according to claim 8, wherein the update module is configured to update the weights set by the weighting module.

10. The networked computing system according to claim 1, wherein the application component comprises an output module configured to perform an error correction on the at least one combined predicted configuration parameter, the output module being further configured to output the at least one combined predicted configuration parameter to the control component.

11. A method for controlling a networked computing system, wherein at least one network communication interface is connected to at least one network for sending and receiving data to and from the at least one network, the method comprising:
 providing parameters describing at least one current route and/or data carried on the at least one current route;
 monitoring the parameters and predicting one or more future route configurations for data to and/or from the at least one network;
 evaluating the monitored parameters and outputting at least one predicted configuration parameter for the one or more future route configurations based on at least one of the monitored parameters and parameters of one or more past routes;
 weighting the at least one predicted configuration parameter with a weighting parameter based on the monitored parameters and outputting at least one weighted predicted configuration parameter, wherein the weighting is based on a real time evaluation of the monitored parameters;
 combining the at least one weighted predicted configuration parameter and at least one other weighted predicted configuration parameter and outputting at least one combined predicted configuration parameter; and
 dynamically configuring and/or reconfiguring the routes based on the at least one combined predicted configuration parameter.

12. The method according to claim 11, wherein the at least one prediction configuration is determined according to a time series algorithm.

13. The method according to claim 11, wherein the parameters describing at least one current route and/or data carried on the at least one current route are performance metrics including information regarding at least one of a frame delay rate, a jitter rate and a packet loss rate, transmitted packets, received packets, received bytes, transmitted drops, received drops, transmitted errors, flow count transmitted packets, transmitted bytes, and received errors.

14. A non-transitory, computer readable medium storing executable instructions, which when executed by a processor in at least one network communication interface, provide at least the following operations for controlling a networked computing system, wherein the at least one network communication interface is connected to at least one network for sending and receiving data to and from the at least one network, the operations comprising:
 providing parameters describing at least one current route and/or data carried on the at least one current route;
 monitoring the parameters and predicting one or more future route configurations for data to and/or from the at least one network;
 evaluating the monitored parameters and outputting at least one predicted configuration parameter for the one or more future route configurations based on at least one of the monitored parameters and parameters of one or more past routes;
 weighting the at least one predicted configuration parameter with a weighting parameter based on the monitored parameters and outputting at least one weighted predicted configuration parameter, wherein the weighting is based on a real time evaluation of the monitored parameters;
 combining the at least one weighted predicted configuration parameter and at least one other weighted predicted configuration parameter and outputting at least one combined predicted configuration parameter; and
 dynamically configuring and/or reconfiguring the routes based on the at least one combined predicted configuration parameter.

15. The non-transitory, computer readable medium according to claim 14, wherein the at least one prediction configuration is determined according to a time series algorithm.

16. The non-transitory, computer readable medium according to claim 14, wherein the parameters describing at least one current route and/or data carried on the at least one current route are performance metrics including information regarding at least one of a frame delay rate, a jitter rate and a packet loss rate, transmitted packets, received packets, received bytes, transmitted drops, received drops, transmitted errors, flow count transmitted packets, transmitted bytes, and received errors.

17. A computing system comprising
 a processor in communication with a storage medium storing instructions for execution by the processor;
 a communication interface configured to cooperate with the processor to receive data and to send data;
 the processor, when executing the instructions stored in the storage medium, configured to provide control and application components, wherein:
  the control component configured to provide parameters describing at least one current route and/or data carried on the at least one current route;
  the application component configured to monitor the parameters provided by the control component and predict one or more future route configurations for data to and/or from the at least one network, wherein the application component comprises:
   a prediction module configured to evaluate the monitored parameters of the received data, and to output at least one predicted configuration parameter for the one or more future route configurations based on at least one of the monitored parameters and parameters of one or more past routes provided by the control component;
   a weight module configured for weighting the at least one predicted configuration parameter with a weighting parameter based on the monitored parameters and to output at least one weighted predicted configuration parameter, wherein the weighting is based on a real time evaluation of the monitored parameters;
   a combination module configured to combine the at least one weighted predicted configuration parameter and at least one other weighted predicted configuration parameter and output at least one combined predicted configuration parameter; and
  the control component is further configured to dynamically configure and/or reconfigure the routes during operation of the computing system, based on the at least one combined predicted configuration parameter output by the application component.

18. The computing system according to claim 17, wherein the prediction module implements at least one prediction model configured to make predictions according to a time series algorithm.

19. The computing system according to claim 17, wherein the parameters describing at least one current route and/or data carried on the at least one current route are performance metrics determined by the monitoring module, wherein the monitoring module is further configured to supply the performance metrics to the prediction module as input to the at least one prediction model.

20. The computing system according to claim 19, wherein the performance metrics include information on at least one of a frame delay rate, a jitter rate and a packet loss rate, transmitted packets, received packets, received bytes, transmitted drops, received drops, transmitted errors, flow count transmitted packets, transmitted bytes, and received errors.

* * * * *

UNITED STATES PATENT AND TRADEMARK OFFICE
CERTIFICATE OF CORRECTION

PATENT NO. : 10,389,585 B2
APPLICATION NO. : 15/529932
DATED : August 20, 2019
INVENTOR(S) : Dror Mizrachi It is certified that error appears in the above-identified patent and that said Letters Patent is hereby corrected as shown below:

On the Title Page (71) Applicants:, "Dror Mizrachi, Munich (DE); Huawei Technologies Co., Ltd., Shenzhen (CN)" should read -- Huawei Technologies Co., Ltd., Shenzhen (CN) --.

Signed and Sealed this
Twenty-second Day of October, 2019

Andrei Iancu
*Director of the United States Patent and Trademark Office*